Patented Dec. 8, 1942

2,304,288

UNITED STATES PATENT OFFICE 2,304,288

TUNG OIL SUBSTITUTE

Raymond A. Swain, Bellevue, Ky., assignor to Interchemical Corporation, New York, N. Y., a corporation of Ohio No Drawing. Application December 14, 1939, Serial No. 309,245

10 Claims. (Cl. 106—250)

This invention relates to drying oils, and has particular reference to modified drying oils of the non-conjugated type which produce varnishes comparable to those produced with China-wood oil.

China-wood oil, or tung oil, is unique among the drying oils in its speed of drying and its tendency to gel on heating in a kettle, the latter tendency being used to control the body of varnishes produced from it. The unique properties of the oil appear to be due to the fact that its principal fatty acid constituent—eleostearic acid—contains double bonds in conjugate position, as distinguished from the unsaturated acids in linseed and similar oils, in which the double bonds are not conjugate. Only one other known raw oil contains substantial quantities of acids with conjugated double bonds—oiticica oil—and this makes a poor substitute for wood oil because of a carbonyl group present in the molecule.

The price of tung oil is subject to wide market fluctuations; and because of its importance in the manufacture of fast drying finishes, many attempts have been made to produce synthetic substitutes. While much improved drying has been obtained with some of these substitutes, they have never acted like tung oil in the kettle, necessitating an entirely different technique for their utilization in the coating industry.

I have discovered that a product resembling tung oil in its action in the kettle, and producing oleoresinous varnishes comparable in drying speed and waterproofness up to about 25 gallons oil length (expressed in gallons of oil per 100 pounds of resin) with tung oil varnishes, can be obtained by reacting a drying oil containing two or more double bonds not in conjugate position with an acid having the —C=C—CO— group, such as maleic acid, using one to three mols of acid per mol of drying oil, and blending the reaction product with a mono- or di-glyceride of a drying oil (preferably a mono-glyceride) in such proportions as to be capable of neutralizing the acid of the reaction product.

The addition product of the acid and the drying oil is of little value in itself, since it dries very slowly; and the physical mixture of the addition product with the partial glyceride dries even more poorly than the addition product alone. However, this mixture will increase in viscosity on being heated, due to a condensation reaction, in a manner almost identical with that of tung oil, and when proper proportions are used, the time of gelation on heating in the presence of resins is almost identical with that of China-wood oil. The gelation can be checked by the addition of resins, oils, or solvents, just as with the tung oil. When oleoresinous varnishes are made up to 25 gallon oil length, the resultant varnish made with my substitute is directly comparable with a China-wood-oil varnish in all particulars; above 25 gallon length, varnishes made with this oil are generally inferior to wood oil varnishes.

While I can obtain excellent results with from one to three mols of an acid such as maleic to one mol of drying oil, I find that most efficient and economical results are obtained with a ratio of 1½ mols of acid per mol of drying oil, in the original reaction. The reaction product should be mixed with a mono- or di-glyceride containing preferably at least a sufficient number of free hydroxyl groups to neutralize the free acid remaining in the original reaction product, as determined by its acid number.

The use of smaller quantities of partial drying oil glyceride produces an end product of high acid number, and one slower in reaction time. Amounts in excess of the theoretical figure may be employed without unduly affecting the reaction rate in the varnish kettle, and the accompanying rate of bodying. With mono-glyceride, the use of amounts equivalent to the total maleic anhydride used does not seem to affect the bodying rate at all; beyond this there is a gradual decrease in rate of bodying, which makes the bodying rate unsatisfactory above about 75 pounds of mono- or di-glyceride per 100 pounds of reaction product.

Typical examples of my invention are the following:

*Example 1—Linseed oil reaction product*

(A) A 500 gallon closed, stainless steel kettle equipped with agitator and means for keeping oil under an inert atmosphere is used. 3120 pounds of linseed oil are heated to 400° F. under an inert atmosphere and 522 pounds of maleic anhydride are slowly added. As an alternate the oil and maleic anhydride can be heated simultaneously. If the maleic anhydride is added to the oil, care should be taken that the temperature does not decrease below 360° F. during addition. The maleic anhydride and oil are then allowed to react for a period of five to six hours at 400° F. under an inert atmosphere, the product being constantly agitated. Yield will be approximately 95% to 97%.

(B) In a kettle as previously described, 2624 pounds of linseed oil and 576 pounds of glycerine are heated to 450° F. under agitation and inert atmosphere. Appropriate catalysts such as litharge or sodium hydroxide are employed which assist in the alcoholysis of the oil to the so-called mono-glyceride. The end product is reached when the ester will remain clear when diluted with methyl alcohol to a 30% solution.

(C) In order to approximate a product which resembles wood oil when heated alone or with gums to make varnishes, a physical mixture of "A" and "B" is made.

Since product "A" will have an acid number (milligrams KOH required to neutralize one gram of material) of from 45 to 65 (average 50), the amount of "B" necessary to yield free hydroxyls equivalent to the acid number (based on a molecular weight of 354 for "B") will be 15.8% of "A", while the amount required to be equivalent to the total maleic anhydride is 34.5%. The finished product may therefore be made by agitating together 1000 pounds of "A" with 158 to 345 pounds of "B", with substantially no change in the bodying rate; while satisfactory bodying can be attained up to about 750 pounds of "B".

In this example, a mixture of 1000 pounds of "A" and 316 pounds of "B" is made.

In reaction "A", the reaction will take place at about 400° F. or higher. Substantially higher temperatures cause loss of maleic anhydride, while temperatures above 500° F. cause undesirable polymerization of the oil, and should be avoided.

*Example 2—20 gallon varnish*

Varnishes were prepared, using tung oil and the product of Example 1, according to the following formula:

Resin (glycerol-rosin ester, containing 15%
  phenol-aldehyde resin)_____pounds__ 145
Oil (tung oil, or product of Example 1)
  do____ 230
Kerosene _____gallons__ 20
Terpinolene_____do____ 2
Hydrogenated petroleum naphtha (dist.
  range 350–410° F.)_____do____ 25

*Procedure.*—All the oil and 130 pounds of the resin are heated to 575° F. in 40 minutes, and held for body in conventional manner, to a heavy drop on the hot paddle. The remaining resin is then added, the batch is rapidly cooled to 510° F., and allowed to cool slowly to a sign of stringing on the paddle. It is then rapidly cooled and reduced.

The varnishes made from tung oil and my synthetic oil dry identically, and have similar resistance to water and alkali. The varnish made with my new oil shows less tendency toward wrinkling than the wood oil varnish.

Example 1 may be repeated, using perilla oil in place of linseed oil, with directly comparable results. Other drying oils may be used, including walnut, poppy seed, sunflower and similar oils. Various drying fish oils, particularly menhaden, sardine and pilchard oils, can be used; since they are very unsaturated, they can react with more maleic anhydride than conventional drying oils. Tests run on these oils and varnishes made therefrom indicate results comparable to those obtained with linseed oil.

As indicated in Example 2, varnishes of considerable oil length can be made, and my products are directly comparable with tung oil in varnishes up to 25 gallon length (approximately 1 part of resin to 2 parts of oil, by weight). I have tested my new wood oil substitutes with many resins, and find them comparable to tung oil with all. These resins include rosin, ester gum, limed and zinced rosins, natural fossil resins such as kauri and congo copal, cumar, alkyd, petroleum polymer, and other synthetic resins and the like, which are not substantially oil-reactive, as well as the very oil-reactive synthetic resins, exemplified by the phenol-aldehyde resins. The varnishes can be prepared at any temperature in excess of about 425° F., where the reaction commences. Temperatures in excess of 600° F. should be avoided, since the reaction is too rapid above this point to be easily controllable.

The original reaction between the drying oil and the acid may be effected with any acid containing a —C=C—CO— group. Maleic acid in the form of the anhydride is the cheapest acid of this group, which also includes fumaric, itaconic, crotonic and the like acids.

Various changes can be made in the examples without departing from the scope of my invention, which is defined in the claims.

I claim:

1. A tung oil substitute comprising a mixture of a reaction product of between 1 and 3 mols of an acid containing a —C=C—CO— group and a drying oil containing two or more unconjugated double bonds, and a glycerol drying oil acid ester containing an amount of free hydroxyl substantially equivalent to at least the di-glyceride.

2. A tung oil substitute comprising a mixture of a reaction product of between 1 and 3 mols of an acid containing a —C=C—CO— group and one mole of a drying oil containing two or more unconjugated double bonds, and a glycerol drying oil acid ester containing free hydroxyl at least substantially equivalent to the acidity of said reaction product as determined by its acid number.

3. The mixture of claim 2 in which the ratio of glycerol ester to acid reaction product is not above 75 to 100.

4. A tung oil substitute comprising a mixture of a reaction product of between 1 and 3 mols of maleic acid and one mol of a drying oil containing two or more unconjugated double bonds, and a glycerol drying oil acid ester containing an amount of free hydroxyl substantially equivalent to at least the di-glyceride.

5. A tung oil substitute comprising a mixture of a reaction product of between 1 and 3 mols of maleic acid and one mol of a drying oil containing two or more unconjugated double bonds, and a glycerol drying oil acid ester containing free hydroxyl at least substantially equivalent to the acidity of the maleic acid reaction product as determined by its acid number.

6. The mixture of claim 5 in which the ratio of glycerol ester to acid reaction product is not above 75 to 100.

7. The method of making a tung oil substitute which comprises reacting 1 to 3 mols of an acid containing a —C=C—CO— group with one mol of a drying oil containing two or more unconjugated double bonds at 400°–500° F. until a reaction product is formed, and mixing the reaction product with a drying oil acid ester of glycerol containing free hydroxyl, using a sufficient quantity of the ester to produce a number of hydroxyls at least substantially equivalent to the acidity of said reaction product as determined by its acid number, but not over 75 parts of glycerol ester to 100 parts of reaction product.

8. The method of claim 7, in which the acid is maleic.

9. A tung oil substitute comprising a mixture of a product resulting from the reaction of between 1 and 3 mols of maleic acid and one mol of linseed oil, and sufficient quantity of a glycerol ester of linseed fatty acids containing free hydroxyl at least substantially equivalent to the acidity of the maleic acid reaction product as determined by its acid number.

10. A method of making a tung oil substitute which comprises reacting 1 to 3 mols of maleic acid with one mol of linseed oil at 400° F. to 500° F. until a reaction product is formed, and mixing the reaction product with a sufficient quantity of a glycerol ester of linseed oil containing free hydroxyl at least substantially equivalent to the acidity of the maleic acid reaction product as determined by its acid number.

RAYMOND A. SWAIN.